(12) United States Patent
Zhou et al.

(10) Patent No.: US 10,995,797 B2
(45) Date of Patent: May 4, 2021

(54) ELECTROPLATED COMPONENT OF A ROLLING ELEMENT BEARING

(71) Applicant: Aktiebolaget SKF, Gothenburg (SE)

(72) Inventors: Xiaobo Zhou, Houten (NL); Yannick Baubet, Leiden (NL); Johannes Biegner, Prichsenstadt (DE); Christine Matta, Utrecht (NL); Hubertus Laurentius Maria Peek, Gaastmeer (NL); Hans Verschoor, Beusichem (NL); Roel van der Zwaan, Ter Aar (NL)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/027,415

(22) Filed: Jul. 5, 2018

(65) Prior Publication Data
US 2019/0024715 A1   Jan. 24, 2019

(30) Foreign Application Priority Data
Jul. 5, 2017   (GB) ..................... 1710821

(51) Int. Cl.
*F16C 33/34* (2006.01)
*F16C 33/44* (2006.01)
*F16C 33/56* (2006.01)

(52) U.S. Cl.
CPC .......... *F16C 33/34* (2013.01); *F16C 33/445* (2013.01); *F16C 33/565* (2013.01); *F16C 2204/34* (2013.01); *F16C 2223/70* (2013.01); *F16C 2240/60* (2013.01)

(58) Field of Classification Search
CPC ...... F16C 33/34; F16C 33/445; F16C 33/565; F16C 2223/70; F16C 2204/34; F16C 2240/60; F16C 33/203–206
See application file for complete search history.

(56) References Cited

U.S. PATENT DOCUMENTS

| | | | |
|---|---|---|---|
| 3,660,251 A * | 5/1972 | Fluhmann | C25D 3/38 205/103 |
| 3,737,204 A * | 6/1973 | Burkhardt | F16C 33/64 384/569 |
| 3,755,096 A | 8/1973 | Passal | |
| 4,405,663 A | 9/1983 | Kinkelaar et al. | |

(Continued)

FOREIGN PATENT DOCUMENTS

| CN | 105088290 A | 11/2015 |
|---|---|---|
| EP | 1004683 A1 | 5/2000 |

(Continued)

OTHER PUBLICATIONS

Search and Examination report from the British patent office dated Dec. 14, 2017 in related application GB1710821.8.

*Primary Examiner* — Alan B Waits
(74) *Attorney, Agent, or Firm* — J-TEK Law PLLC; Scott T. Wakeman; Mark A. Ussai

(57) ABSTRACT

A bearing component of a rolling element bearing, such as a rolling element, a bearing ring, and/or a cage for retaining rolling elements of a rolling element bearing, has an outer surface with a plating layer providing at least 97 wt. % tin. The tin of the plating layer provides alpha and beta phases of tin in an alpha/beta phase ratio of less than 10%.

13 Claims, 1 Drawing Sheet

(56) References Cited

U.S. PATENT DOCUMENTS

| | | | |
|---|---|---|---|
| 5,209,578 A * | 5/1993 | Eastham | C23C 14/16 |
| | | | 384/276 |
| 5,482,385 A * | 1/1996 | Yokota | F16C 33/30 |
| | | | 384/527 |
| 6,994,475 B2 * | 2/2006 | Doll | F16C 33/445 |
| | | | 384/492 |
| 7,147,926 B2 * | 12/2006 | Mickelson | F16C 23/084 |
| | | | 428/457 |
| 7,846,506 B1 * | 12/2010 | Bhattacharya | C04B 41/009 |
| | | | 427/404 |
| 7,942,583 B2 * | 5/2011 | Hattori | F16C 33/427 |
| | | | 384/527 |
| 9,097,281 B2 * | 8/2015 | Rittmeyer | F16C 33/445 |
| 9,284,982 B2 * | 3/2016 | Kawamura | F16C 33/414 |
| 9,416,821 B2 | 8/2016 | Sato et al. | |
| 2004/0179762 A1 * | 9/2004 | Doll | F16C 33/6696 |
| | | | 384/492 |
| 2011/0143975 A1 | 6/2011 | Zidar | |
| 2012/0093452 A1 * | 4/2012 | Sato | F16C 9/04 |
| | | | 384/457 |
| 2015/0292558 A1 * | 10/2015 | Sato | F16C 19/463 |
| | | | 384/573 |
| 2016/0333489 A1 * | 11/2016 | Gorges | C25D 3/30 |
| 2018/0017107 A1 | 1/2018 | Zidar | |

FOREIGN PATENT DOCUMENTS

| | | | | |
|---|---|---|---|---|
| EP | 2497845 A1 | 9/2012 | | |
| GB | 2509164 A | 6/2014 | | |
| JP | 2002195266 A | 7/2002 | | |
| JP | 2004332899 A | * 11/2004 | | F16C 33/445 |
| JP | 2005147306 A | 6/2005 | | |
| JP | 2009192070 A | 8/2009 | | |
| JP | 2012097872 A | 5/2012 | | |
| WO | 9723664 A1 | 7/1997 | | |
| WO | 2016131074 A1 | 8/2016 | | |

* cited by examiner

ELECTROPLATED COMPONENT OF A ROLLING ELEMENT BEARING

CROSS-REFERENCE

This application claims priority to British patent application no. 1710821.8 filed on Jul. 5, 2017, the contents of which are fully incorporated herein by reference.

TECHNOLOGICAL FIELD

The present invention relates to the field of rolling element bearings and is more particularly directed to a component of a rolling element bearing that is electroplated with a metal coating for improving wear resistance.

BACKGROUND

In use, the rolling elements and/or the cage of a rolling element bearing experience/s cyclical sliding contact with a bearing ring raceway in the case of the rolling element, with the rolling elements in the case of ball-guided or roller-guided cages, or with the shoulder of the bearing race in the case of ring-guided cages. This cyclical sliding contact may lead to severe wear, especially in high-speed applications where lubrication conditions are poor, such as in e.g. gearbox bearings, automotive engine bearings, aero engine main shaft bearings and spindle bearings.

To counteract this problem, it is for example known to provide the guiding surface of a cage with a hard diamond-like coating, such as disclosed in JP2005147306. Alternatively, a soft metal film may be applied to the cage surfaces, such as disclosed in JP2002195266, whereby a silver plating layer with a thickness of 25-50 μm is provided on a cage made of low-carbon steel. DLC coatings and silver are, however, expensive materials.

In JP2012097872, a tin coating is proposed, which has the advantage of being a cheaper material. A coating comprising tin and a second metal with a lower surface free energy than iron, e.g. zinc, is proposed in U.S. Pat. No. 9,416,821, whereby the second metal is present in the coating in an amount of 5-35 wt. % and the coating has a thickness of between 5 and 30 μm. After a cage rotation test was performed on specimens having a plating layer of pure tin and a plating layer consisting of tin and zinc, the pure tin layer was found to exhibit an inferior wear state.

Consequently, there is room for improvement in terms of providing a coated component for a rolling element bearing which is economical and straightforward to manufacture, whereby the coating provides low friction and durable wear resistance.

SUMMARY

The present invention resides in a bearing component, such as a roller element, a bearing ring, or a cage made of a metal material, whereby a contacting surface of the bearing component is provided with a ductile plating layer comprising at least 97 wt. % tin, or nickel or copper.

Tin is a post-transition metal with two main allotropes or phases, commonly referred to as beta-tin and alpha-tin. At room temperature, the stable phase is beta-tin, which has a tetragonal structure. At low temperatures, beta-tin transforms into alpha-tin, which has a diamond cubic structure. Nonetheless, even at temperatures above the transformation temperature, conventional tin coatings have been found to comprise both alpha-tin and beta-tin in an alpha/beta phase ratio of 5-20%.

In a bearing component according to the invention, the tin plating layer comprises less than 10 mol % alpha-tin, preferably less than 5 mol %, and most preferred no more than 4 mol % alpha-tin. In a preferred embodiment, the tin plating layer comprises no more than 3 mol % alpha-tin.

It has been found that a bearing component having a tin plating layer with a correspondingly high level of beta-tin, i.e. over 90 mol %, preferably at least 96 mol %, exhibits improved friction and wear behaviour and has a longer life than bearing components with a tin plating layer that comprises lower levels of beta-tin.

Alternatively, the ductile plating layer may comprise electroless nickel, electrolytic nickel or copper.

The ductile metallic plating layer allows for enhancing the conformity of the rolling elements with raceways without sacrificing the bearing fatigue life. Usually the bearing life is reduced due the fact that a small contact area usually results in a higher contact pressure, but provides a reduced friction torque.

Due to the ductile features of the plating layer, the plating layer may be plastically deformable during rolling contact and/or may even be removed during run-in periods. The deformed and/or removed layer changes the contact geometry and/or enhances the conformity of the rolling elements with the raceway by reducing the Hertz contact area. This in turn reduces the friction torque without reducing the bearing fatigue life.

It is further preferred that the bearing component which is provided with the ductile layer plate is a cage of a rolling element bearing which is in sliding contact with at least one of rollers and bearing ring of the rolling element bearing. It is preferred that the surface of the at least one of rollers and bearing ring of the rolling element bearing which is in sliding contact with the cage is provided with a layer of black oxide. Therefore the surface areas of the cage and the rollers or the bearing ring which are in sliding contact are forming sliding contact partners of a ductile layer containing tin and a layer of black oxide. Preferably the outer surface of the bearing ring provided with the layer of black oxide is a raceway or a shoulder of the bearing ring. Moreover, it is advantageous that the black oxide layer has a thickness between 0.2 and 1.3 μm, preferably between 0.5 and 1 μm.

A bearing component according to the invention may be produced in an electroplating process in which the bearing component is immersed in a bath of electrolyte comprising tin (or nickel or copper) ions, and forms the cathode in an electrolysis circuit. In some embodiments, an acid tin plating process is used in which the electrolyte comprises stannous sulphate and sulphuric acid. In other embodiments, an alkali tin plating process is used in which the electrolyte comprises an alkali metal stannate such as sodium or potassium stannate. In both embodiments, bath temperature is specifically selected and carefully controlled during the plating process.

The present inventors have found that the temperature of the electrolyte bath plays an important role in the ratio of alpha-tin to beta-tin that is present in the plating layer. The mechanism is not completely understood, but it appears that temperature "windows" exist, where the formation of alpha-tin is suppressed. Such a window exists between a temperature of 25° C. and 35° C. In one experiment that was conducted using identical samples, bath compositions and process parameters, whereby only temperature was varied, it was found that a bath temperature of 35° C. produced an alpha/beta phase ratio of less than 3%, while a bath temperature of 40° C. resulted in an alpha/beta phase ratio of 10%. Another window exists between 60° C. and 80° C., showing the same alpha/beta phase ratios as the first window for lower temperatures.

In some embodiments, the tin plating layer consists of pure tin. In other embodiments, the tin plating layer comprises up to 3 wt. % of one or more of the following elements: antimony, bismuth, indium or silver. It is thought that the addition of one or more of these elements stabilizes the beta phase. In an embodiment, the tin plating layer consists of 99.5-99.9 wt. % tin and 0.1-0.5 wt. % of antimony, bismuth, indium and/or silver.

The bearing components on which the plating layer is provided is made of a metal material such as steel, aluminium or bronze, and may be an inner ring, an outer ring, a rolling element, and/or a ball-guided cage, a roller-guided cage or a ring-guided cage that is configured run on a shoulder or flange of the bearing inner ring or of the bearing outer ring. The cage may also be a split cage, for automotive engine applications. In case of a cage, the plating layer may have a thickness of between 1 and 100 μm, preferably between 5 and 30 μm. In case the plating layer is applied to a raceway of a ring and/or the rolling element, the plating layer preferably has a thickness of less than 5 μm, most preferred of less than 3 μm.

The invention will now be described further with reference to examples and the accompanying drawings.

DETAILED DESCRIPTION

Figure 1:
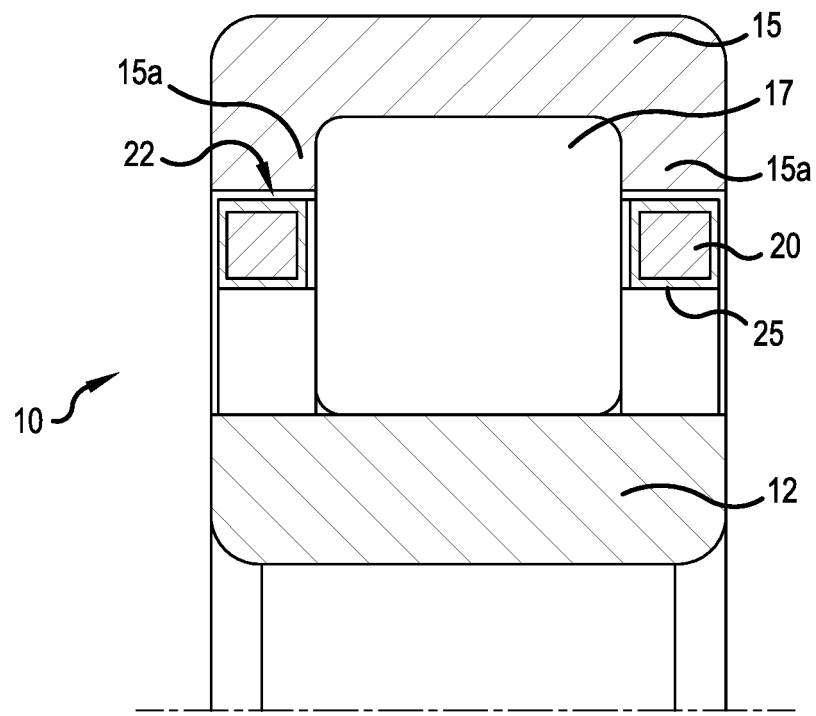
FIG. 1 shows a cross-section of part of roller bearing comprising a cage provided with a surface layer of tin according to the invention.

A cross-sectional view of part of a roller bearing is shown in FIG. 1. The bearing 10 has an inner ring 12, an outer ring 15 and a row of cylindrical rollers 17 disposed therebetween on inner and outer raceways of the bearing rings. In the depicted example, the bearing outer ring 15 has flanges 15a at either axial side of the outer raceway, which extend in a radially inward direction and which guide the rollers during bearing operation. The rollers are held spaced apart by a cage 20, which in this example is centred and guided on the outer ring flanges 15a and is formed from a low-carbon steel material.

Let us assume that the bearing supports an engine crankshaft and is lubricated with engine oil. During bearing operation, a radially outer surface 22 of the cage is in sliding contact with radially inner surfaces of the outer ring flanges 15a. In the absence of a proper lubrication film, high friction and wear takes place. To mitigate this problem, the outer surfaces of the cage, the rings and/or the rollers are electroplated with a tin coating 25.

In accordance with the invention, the tin coating 25 comprises alpha-phase tin and beta-phase tin in an alpha/beta phase ratio of less than 10 mol % alpha-tin, preferably less than 5 mol %, and in case of the component being a cage of no more than 4%. A tin coating having a correspondingly high percentage of beta-phase tin has been found to generate low friction and exhibit excellent durability, as will be demonstrated by the following examples.

A number of samples were prepared and subjected to a pin-on-disc friction test, in which a disc sample is mounted on a rotating platform and a pin in the form of a ball is pressed against the rotating disc. The base material for the disc samples was a low-alloy carbon steel (ST24), which is a common material for bearing cages. The disc samples were turned and then electroplated with metal coatings as follows:

TABLE 1 material, thickness and hardness of coatings provided on disc samples

| Metal coating | Thickness (μm) | Hardness (HV) | Comment |
|---|---|---|---|
| Bronze | 10 | 200 | |
| Copper | 0.8 | 160 | |
| Silver | 25-50 | 40 | |
| Tin-A | 10 | 60 | Pure tin coating containing ~20 mol % alpha-phase tin, measured using X-ray diffraction |
| Tin-B | 8 | 60 | Pure tin coating according to invention containing ~2 mol % alpha-phase tin, measured using X-ray diffraction |

The coefficient of sliding friction was measured at the start of the test and at the end of the test under the following conditions:

Ball: DIN 100Cr6 steel, martensitically hardened (hardness 780-800 HV), diameter 12.7 mm, surface roughness Rq=0.01 μm Flat disc samples: ST24 cage steel, un-hardened (hardness 230 HV), surface roughness before coating Ra=1.6 μm Linear sliding speed: 1 m/s (400 rpm at 25 mm radius of the disc)

Lubrication oil: Engine oil, Fuchs TITAN EM 225.26 (HTHS 2.9), viscosity: 55.2 mm$^2$/s at 40° C. and 10.1 mm2/s at 100° C.

Test oil temperature: 90° C.

Test duration: 4 hours

Furthermore, the surface roughness of the samples was measured before the test and after the test. The ball produces a wear track on the disc surface and it is the surface roughness of the wear track that is measured. The test results are given in Table 2.

TABLE 2

Friction coefficient measured with pin-on-disc test rig at the beginning and end of the tests, plus surface roughness before and after the tests.

| Coatings | Surface roughness Ra before test (μm) | Ra of wear track after POD test (μm) | Coeff. of friction in POD test, start of test | Coeff. of friction in POD test, end of test |
|---|---|---|---|---|
| Un-coated | 1.60 | 0.11 | 0.076 | 0.07 |
| Bronze | 1.7 | 1.42 | 0.085 | 0.08 |
| Copper | 0.8 | 0.286 | 0.05 | 0.046 |
| Silver | 1.11 | 0.084 | 0.02 | 0.018 |
| Tin-A | 1.68 | 0.54 | 0.048 | 0.044 |
| Tin-B | 1.98 | 0.795 | 0.022 | 0.02 |

As may be seen, the Tin-B coating in accordance with invention generates a low and stable coefficient of friction comparable to that of the much more expensive silver coating. It is also noteworthy that the Tin-B coating (with an alpha/beta phase ratio of 2%) generates lower sliding friction than the Tin-A coating (with an alpha/beta phase ratio of 20%) despite the fact that Tin-A coating has a lower surface roughness.

Without being bound by the theory, it is thought that this is attributable to the different crystalline structure of the two tin phases. The beta phase has a tetragonal structure and is highly ductile, since the crystal can be sheared along the tetragonal crystalline planes. The alpha phase has a cubic structure, which resists the shearing of the beta phase, making the metal more brittle. It is also thought that the high ductility and shearing behaviour of a tin coating according to the invention improves the durability of the coating.

A wear resistance test was performed on samples provided with the coatings as given in table 1.

Rings made of low-alloy carbon steel (ST24) were electroplated with the coatings and mounted on the shaft of a friction-torque test rig. The test conditions were as follows:
Coated ring: ST 24, turned surface (Ra~1.6 μm before coating), ring external diameter 67.5 mm, inner diameter 60 mm and height 48 mm, hardness 230 HV
Counter face: CRB 208ECP outer ring shoulders, diameter 67.5 mm, width 3 mm, DIN 100Cr6 hardened steel, hardness 780-800 HV, surface roughness Ra~0.2 μm
Rotating speed: 500, 1000, 2000, 3000 rpm
Load: 0-50 kg (on sample)
Lubrication oil: Engine oil, Fuchs TITAN EM 225.26 (HTHS 2.9), viscosity: 55.2 mm$^2$/s at 40° C. and 10.1 mm$^2$/s at 100° C.
Oil flow rate: 20 and 150 cc/min
Oil temperature: ambient temperature,
Test duration: 100 hours
Friction torque is measured during the test and wear life is determined by the following two measurements:
1) When the friction torque exceeds 0.375 Nm
2) When damage to the coating is observed under optical microscopy inspection.

The results of the test are shown in Table 3.

TABLE 3

Endurance life (hours) and friction torque measured at the end of the life. Test condition: load 300N, speed 3000 rpm, room temperature, oil flow 150 cc/min

| Sample | Surface roughness Ra before test (μm) | Friction torque at end of the tests (Nm) | Endurance life (hours) |
|---|---|---|---|
| Uncoated steel (ST24) | 1.33-1.40 | 0.45-0.6 | 29-45 |
| Bronze | 1.58-1.59 | 0.225 | 100 |
| Copper | 1.35-1.43 | 0.38 | 35 |
| Silver | 1.11-1.18 | 0.375-0.45 | 100 |
| Tin-A | 0.75-0.76 | 0.825 | 70 |
| Tin-B | 1.09-1.29 | 0.225 | 100 |

As may be seen from the results, the tin coating of the invention Tin-B reached the end of the 100-hr test and exhibited low frictional torque, while the comparative coating Tin-A only lasted 70 hours. The tin coating of the invention is more durable.

In order to produce a tin coating containing at least 90 mol. % beta-tin, the present inventors have found that it is necessary to carefully select and control the bath temperature during the electroplating process.

Figure 2:
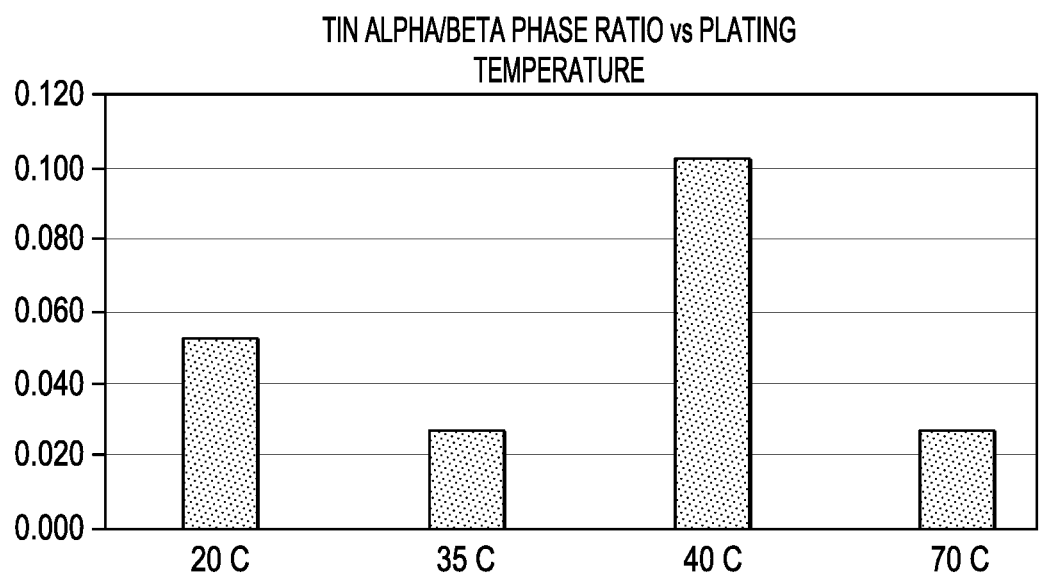
FIG. 2 shows the effect of differing plating temperatures

Experiments were conducted in which samples made of low-carbon steel were immersed in a stannous sulphate bath composition comprising 40 g/L of tin and 120 g/L of sulfuric acid. Each sample was connected as the cathode to an anode made of pure tin and electroplated at a specific temperature, which temperature was varied for the different samples, keeping all other process parameters constant. After completion of the electroplating process, the plating layer was examined using X-ray diffraction, to determine the relative content of alpha-tin to beta-tin. The results are shown in bar chart of FIG. 2.

As may be seen, a temperature of 35° C. leads to the production of a tin coating according to the invention, with an alpha/beta phase ratio of less than 3%, while a temperature of only 5 degrees higher leads to a significantly higher content of alpha-tin. A process temperature of 70° C. also resulted in a tin coating according to the invention.

Although the mechanism is not fully understood, it appears that narrow temperature ranges or "windows" exist in which the formation of alpha-tin is greatly suppressed. Such a window exists between a temperature of 25° C. and 35° C. Another window exists between 60° C. and 80° C., showing the same alpha/beta phase ratios as the first window for lower temperatures. A bearing cage according to the invention is electroplated with tin at a temperature that falls within an identified temperature window, to produce a tin coating with enhanced durability and low-friction performance.

A number of aspects/embodiments of the invention have been described. The invention is not restricted to the described embodiments, but may be varied within the scope of the accompanying patent claims.

What is claimed is:

1. A bearing component of a rolling element bearing comprising:
   a bearing ring, or
   a bearing cage,
   wherein an outer surface of the bearing component is provided with a ductile plating layer comprising at least 97 wt.% tin, the tin of the plating layer comprising alpha and beta phases of tin in an alpha/beta phase ratio of less than or equal 4%, and one or more elements selected from: antimony, bismuth, indium and silver.

2. The bearing component of claim 1, wherein the ductile plating layer has a thickness of less than 3 μm.

3. The bearing component of claim 1, wherein the ductile plating layer comprises pure tin.

4. The bearing component of claim 1, wherein the ductile plating layer comprises 99.5-99.9 wt.% tin and 0.1-0.5 wt.% of antimony, bismuth, indium and/or silver.

5. The bearing component according to claim 1, wherein the alpha/beta phase ratio is less than or equal to 3%.

6. The bearing component according to claim 1,
   wherein the bearing component is the bearing cage; and
   wherein the ductile plating layer has a thickness of between 5 and 30 μm.

7. A bearing component of a rolling element bearing comprising:
   a bearing cage,
   wherein an outer surface of the bearing cage is provided with a ductile plating layer comprising at least 97 wt.% tin, the tin of the plating layer comprising alpha and beta phases of tin in an alpha/beta phase ratio of less than 10%, or
   wherein the ductile plating layer comprises at least 97 wt.% electroless nickel, or at least 97 wt.% electrolytic nickel, or at least 97 wt.% copper,
   wherein the bearing cage is in sliding contact with an outer surface of rolling elements or a surface of a bearing ring, and
   wherein the outer surface of the rolling elements or the surface of the bearing ring is provided with a layer of black oxide so that the ductile plating layer on the bearing cage is in sliding contact with the layer of black oxide.

8. The bearing of claim 7, wherein the black oxide layer has a thickness of between 0.2 to 1.5μm.

9. The bearing component according to claim 7, wherein the ductile plating layer comprises at least 97 wt.% electroless nickel.

10. The bearing component according to claim 7, wherein the ductile plating layer comprises at least 97 wt.% tin, and the alpha/beta phase ration is less than or equal to 4%.

11. A bearing component comprising:
   a bearing cage having an outer surface and a ductile plating layer on the outer surface,
   wherein the ductile plating layer comprising at least 97 wt.% tin,
   wherein the tin includes alpha phase tin and beta phase tin, and
   wherein a ratio of the alpha phase tin to the beta phase tin is less than 4%.

12. The bearing component according to claim 11, wherein the ratio is less than or equal to 3%.

13. The bearing component according to claim 12, wherein the ductile plating layer comprises 99.5-99.9 wt.% tin and 0.1-0.5 wt.% of antimony, bismuth, indium and/or silver.

\* \* \* \* \*